Figure 1:
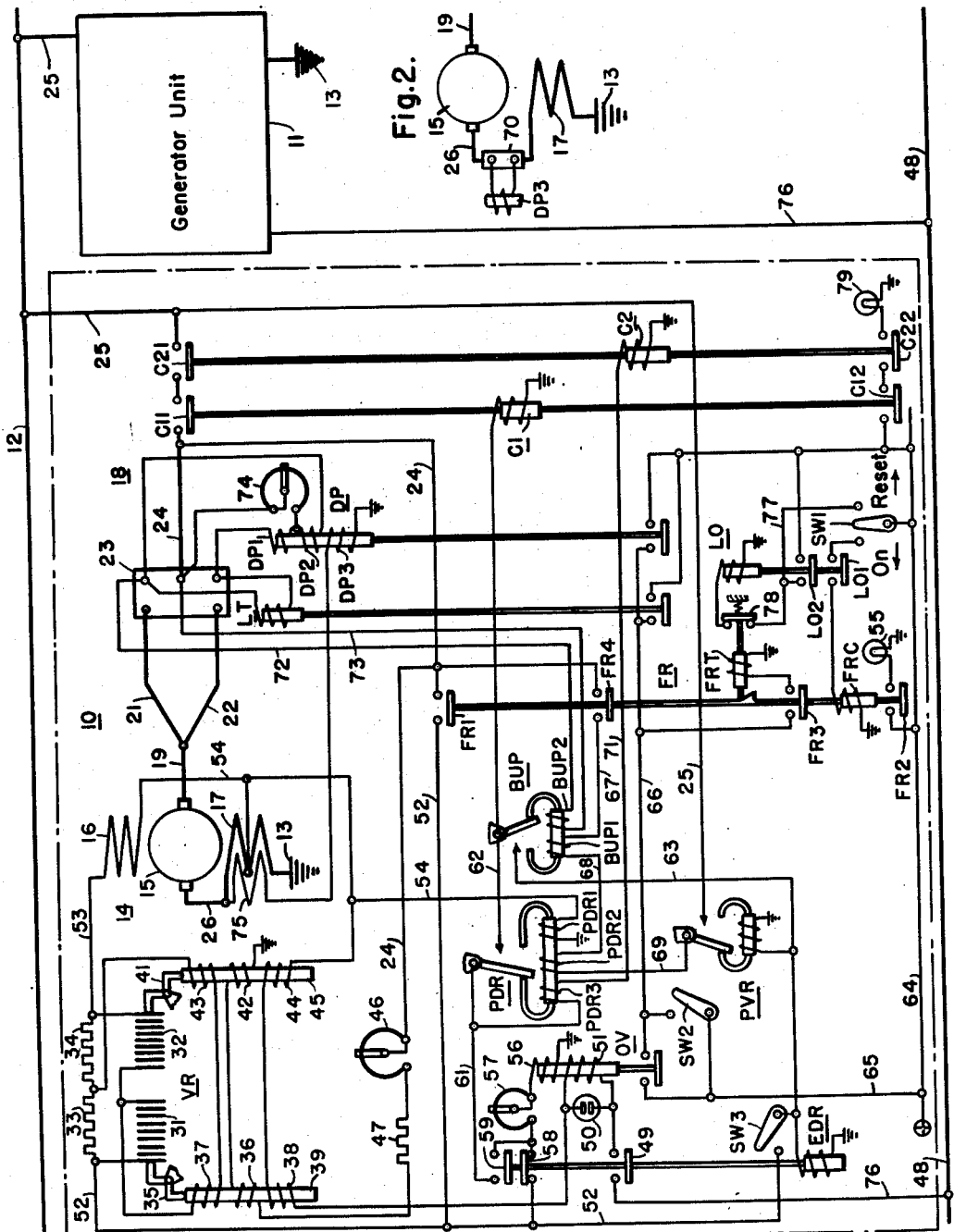

Jan. 19, 1954 B. O. AUSTIN ET AL 2,666,871
ELECTRIC POWER SYSTEM FOR AIRCRAFT
Filed July 15, 1950

WITNESSES:

INVENTORS
Boscum O. Austin and
Ralph D. Jessee.
BY
ATTORNEY

Patented Jan. 19, 1954

2,666,871

UNITED STATES PATENT OFFICE 2,666,871

ELECTRIC POWER SYSTEM FOR AIRCRAFT

Bascum O. Austin and Ralph D. Jessee, Lima, Ohio, assignors to Westinghouse Electric Corporation, East Pittsburgh, Pa., a corporation of Pennsylvania Application July 15, 1950, Serial No. 174,040

8 Claims. (Cl. 317—13)

Our invention relates, generally, to auxiliary electric power systems for aircraft and, more particularly, to a system having a plurality of engine-driven direct-current generators for supplying power to a load bus, such as the system disclosed in the copending application of B. O. Austin, O. C. Walley and D. W. Exner, Serial No. 12,118, filed February 28, 1948, now Patent No. 2,534,895, issued December 19, 1950.

An object of our invention, generally stated, is to provide a control and protective system for aircraft generators which shall be simple and efficient in operation and which may be economically manufactured and installed.

A more specific object of our invention is to simplify and improve the system described in the aforesaid copending application.

Another object of our invention is to provide a differential protective system for each one of a plurality of direct-current generators which are connected to a common bus.

A further object of our invention is to provide temperature compensation for the differential protective system for direct-current generators.

Still another object of our invention is to control the operation of dual switches in a generator circuit to secure back-up protection against reverse current in the generator and failure of one switch to open the generator circuit.

A further object of our invention is to protect against loose or broken connections in the generator circuits.

Other objects of our invention will be explained fully hereinafter or will be apparent to those skilled in the art.

In accordance with one embodiment of our invention, a T-connected shunt is provided in the positive leads for each generator in a power system having two or more direct-current generators connected in parallel-circuit relation to a load or load bus and the actuating coils of a differential relay are so connected to this shunt and the series field winding of the generator that protection is afforded against faults in the generator or its leads. Temperature compensation is provided to maintain a uniform value of tripping current for the differential relay throughout the wide range of temperature variations encountered in aircraft operation. Each generator is connected to the main bus through a pair of switches or contactors, the operation of which is so controlled that back-up protection is afforded against reverse current and failure of one switch to open the generator circuit.

For a better understanding of the nature and objects of our invention, reference may be had to the following detailed description, taken in conjunction with the accompanying drawing, in which:

Figure 1 is a diagrammatic view of an auxiliary electric power supply and control system embodying the principal features of our invention, and Fig. 2 is a detail view of a modification of a portion of the system shown in Fig. 1.

Referring to the drawing, the power system shown therein comprises a pair of generator units 10 and 11 which are disposed to be connected in parallel-circuit relation between a power or load bus 12 and ground 13. More than two generator units may be employed if desired. Since the generator units are similar in construction and operation, only one unit is shown and described in detail in the present application.

The unit 10 comprises a direct-current generator 14 having an armature winding 15, a shunt field winding 16 and a series field winding 17. The generator may be driven by one of the engines (not shown) of an airplane in the usual manner.

The positive terminal of the generator 14 is connected to the load bus 12 through a feeder circuit 18 which comprises a generator lead 19, two parallel-connected feeder conductors 21 and 22 which are connected to the outside terminals of a T-connected shunt 23, a conductor 24 which is connected to the middle terminal of the shunt 23, contact members C11 and C21 of switches C1 and C2, respectively, and conductor 25. The negative terminal of the generator is connected to ground 13 through a lead 26, and the series field winding 17.

As shown, the contact members C11 and C21 of the switches C1 and C2 respectively are connected in series-circuit relation in the feeder circuit 18. As will be described more fully hereinafter, the operation of the switches C1 and C2 is so controlled by relays provided in the system that the contact members C21 are normally opened first to interrupt the generator circuit, and the contact members C11 are opened following the operation of the switch C2, thereby providing back-up protection against reverse current in the generator and failure of the one contactor to open the circuit.

A voltage regulator VR is provided for maintaining a substantially constant generator voltage. The regulator VR controls the energization of the shunt field winding 16 in a manner well known in the art. In this instance the regulator comprises two carbon piles or stacks 31 and 32, and resistors 33 and 34 which are connected in a Wheatstone bridge circuit. The carbon pile 31 may be compressed by a solenoid mechanism 35 having a main coil 36, an auxiliary coil 37 and a paralleling coil 38 disposed to actuate a core 39. The carbon pile 32 may be compressed by a solenoid mechanism 41 having a main coil 42, an auxiliary coil 43 and a paralleling coil 44 disposed to actuate a core 45.

As shown, the main coils 36 and 42 are connected in series-circuit relation between the power conductor 24 and ground in series with an adjustable rheostat 46 and a resistor 47. Thus, these coils are energized in accordance with the generator voltage. The auxiliary coils 37 and 43 are connected in series-circuit relation between two terminals of the Wheatstone bridge comprising the carbon piles 31 and 32 and the resistors 33 and 34. The paralleling coils 38 and 44 are connected between the negative terminal of the generator 14 and an equalizer bus 48 through contact members 49 of an eqalizer disconnect relay EDR, and a coil 51 of an overvoltage relay OV. A ballast lamp 50 may be connected across the coil 51 as shown. The functions of the equalizer disconnect relay and the overvoltage relay will be explained more fully hereinafter.

The circuit for the shunt field winding 16 of the generator extends from the power conductor 24 through contact members FR1 of a field relay FR, conductor 52, the carbon piles 31 and 32, or the resistors 33 and 34 of the voltage regulator VR, conductor 53, the field winding 16, a conductor 54, a portion of the series field winding 17 and the conductor 26 to the negative terminal of the generator.

It will be understood that all of the regulators associated with the several generators connected to the bus 12 are so connected to their respective generators and to the common equalizer bus 48 that the main coils of the regulators function to cause the regulators to maintain the desired generator voltage, and the paralleling coils cause the regulators to maintain the desired load division between the generators.

As mentioned hereinbefore, the circuit for the shunt field winding 16 of the generator is controlled by the contact members FR1 of the field relay FR. As shown, this relay is of a type which is latched in its closed position. The relay is provided with a reset or actuating coil FRC for actuating the relay to its latched position, and a trip coil FRT for actuating the tripping mechanism of the relay.

A lockout relay LO, and a manually operable switch SW1 are provided for retaining the field relay in its tripped position until it is reset by actuating the reset switch SW1. Thus, it is necessary to reset the relay FR after it has once been tripped before the generator can be put back in operation. An indicating lamp 55, which is energized through contact members FR2 of the relay FR is provided for indicating when the relay FR is in its closed position.

In addition to controlling the energizing circuit for the field winding 16 of the generator, the relay FR also functions to partially establish the energizing circuit for the actuating coils of the switches C1 and C2 which connect the generator to the load bus 12, as previously explained. Thus, whenever the field relay FR is tripped, the generator is disconnected from the load bus and its field circuit is opened.

In order to protect against overvoltage conditions, each generator is provided with the overvoltage relay OV which is connected to be responsive to the generator voltage. In addition to the coil 51, previously mentioned, the relay OV is provided with a coil 56, which is connected between ground and the conductor 52 through an adjustable rheostat 57 and either through contact members 58 of the relay EDR to the conductor 52, or through contact members 59 of the relay EDR, conductor 61, contact members of a relay PDR, conductor 62, contact members of a relay BUP, conductor 63, and a manually operable switch SW3 to the conductor 52. As described in a copending application of J. D. Miner, B. O. Austin and R. D. Jessee Serial No. 179,055, filed August 12, 1950, now Patent No. 2,590,265, issued March 25, 1952, the coil 51 is energized by the equalizer current to enable the relays OV for the several generators to select a particular generator which is causing system overvoltage and effect its disconnection from the bus.

The contact members of the relay OV establish an energizing circuit for the trip coil FRT of the field relay FR when the relay OV is closed. The circuit for the trip coil FRT extends from a control power bus 64 through conductor 65, the contact members of the relay OV, conductor 66, contact members FR3 and the trip coil FRT to ground.

It will be noted that the trip coil FRT may also be energized by closing a manually operable switch SW2. Thus, the generator 14 may be removed from service at any time during normal operation if desired by closing the switch SW2. Likewise, any other generator in the power system may be removed from service by closing a corresponding switch.

Each generator in the system is also protected against reverse current flowing through the generator. In case of persistent overvoltage of any one generator in the system, reverse current will flow through those generators which are being regulated for normal voltage. Polarized relays PDR and BUP are provided for protecting the generator 14 against reverse current.

The relay PDR is provided with a reverse current coil PDR1, which is connected across a portion of the series field winding 17 by means of conductor 54. The relay is provided with a differential voltage coil PDR2 which is connected between the generator power conductor 24 and the load bus 12 through a circuit which extends from the conductor 24 through contact members FR4 of the relay FR, conductor 67, a coil BUP1 on the relay BUP, conductor 68, the coil PDR2, conductor 69, the contact members of a relay PVR, and conductor 25 to the load bus 12. The relay PDR is provided with a holding coil PDR3 which is energized through a circuit extending from the conductor 61 through the coil PDR3, conductor 71 and the coil of the switch C2 to ground. The contact members of the relay PDR are connected in the energizing circuit of the operating coil of the switch C2. The reverse current coil PDR1 is energized in response to the current in the generator series field winding 17, and reversal of the direction of current flow through the generator, therefore, reverses the direction of energization of the coil PDR1 and causes it to open the contacts of the relay, thus deenergizing the coil of the switch C2 and effecting disconnection of the generator from the bus.

The relay BUP functions to control the operation of the switch C1 to provide back-up protection for the generator in case the switch C2 fails to open upon a reversal of generator current. In addition to the coil BUP1 previously mentioned, the relay BUP is provided with another coil BUP2 which is connected across one part of the T-connected shunt 23 through conductors 72 and 73. The relay BUP is preferably adjusted to operate on a higher current setting than the relay PDR.

As shown, the contact members of the relay BUP are connected in the energizing circuit for both the switch C1 and the switch C2. The contact members of the relay PDR are connected in the circuit for the switch C2 only. The relays are adjusted so that the contact members of the relay PDR open first to cause the switch C2 to open. If the switch C2 fails to open, the contact members of the relay BUP will open, thereby causing the switch C1 to open to disconnect the generator from the load circuit.

In order to provide for connecting the generator 14 to the bus 12 only when its voltage is of proper polarity and value, the polarized voltage relay PVR is provided to cooperate with the polarized differential relay PDR in controlling the operation of the switch C2. The coil of the relay PVR is connected between ground and the positive terminal of the generator 14 through conductor 63, the switch SW3, conductor 52, and contact members FR1 of the relay FR to the positive power conductor 24. Thus, this relay is responsive to a generator voltage of predetermined magnitude and polarity and the closing of the contact members of this relay is utilized to render the polarized differential relay PDR effective.

As previously explained, the relay PDR is provided with the differential voltage coil PDR2 which is connected between the power conductor 24 and the load bus 12 through the contact members of the relay PVR. Thus, the coil PDR2 is energized in accordance with the difference between the voltage of the bus 12 and the generator 14. Accordingly, the contact members of the relay PDR cannot close to cause the closing of the switch C2 until the generator voltage is substantially equal to or greater than the voltage of the load bus 12, and of the correct polarity.

In order to protect the system against faults, such as grounds in the generator, or the generator leads and the feeder circuit, the T-connected shunt 23 and a differential relay DP are provided. As previously explained, the shunt 23 is connected in the feeder circuit 18 between the generator 14 and the load bus 12. Feeder conductors 21 and 22 are connected to two outside terminals of the shunt, and the conductor 24 is connected to the middle terminal. The relay DP is provided with a coil DP1 which is connected between one outside terminal and the middle terminal of the shunt 23. Another coil DP2 is connected between the other outside terminal and the middle terminal of the shunt. An adjustable rheostat 74 is connected in the circuit for the coils DP1 and DP2. A third coil DP3 is connected across the series field winding 17 of the generator 14.

The coils DP1 and DP2 are connected cumulatively and in opposition to the coil DP3. Since the currents in the two parts of the shunt 23 are equal, in normal operation, and the sum of these currents is equal to the current in the field winding 17, the effect of this arrangement is that the current in the feeder conductor 21 is balanced against the current in the feeder conductor 22, and the sum of these two currents is balanced against the current in the series field winding 17. So long as the respective currents remain equal, the relay DP is not operated. A fault in the generator or the generator leads or the feeder conductors will unbalance the currents and cause the relay DP to close its contact members, which, in turn, establishes an energizing circuit for the trip coil FRT of the field relay FR, thereby causing this relay to function in the manner hereinbefore described to disconnect the generator field circuit and cause the opening of switches C1 and C2 to disconnect the generator from the load bus 12.

In order to compensate for the wide variations in temperature encountered in airplane operation, a length of wire 75 of a material having a high temperature coefficient of resistance, such as pure iron or nickel, is connected in the circuit for the relay coil DP3. The wire 75 is disposed in close proximity to the series field winding 17, as by winding the wire along with the series winding 17.

The ohmic value of the wire 75 is such that any change in temperature due to heat from the series field winding of the generator will compensate for the change in voltage across the series winding resulting from the change in temperature of the generator winding. In other words, the resistance of the wire plus the resistance of the relay coil remain proportional to the resistance of the series winding, thereby maintaining the ratio of generator current to relay current constant. In this manner, the ampere turns in the operating coil DP3 of the differential relay resulting from the generator current are matched against the ampere turns resulting from the current in the shunt 23, throughout the operating range of the generator.

The T-connected shunt 23 is preferably made of a material having a very low temperature coefficient of resistance. The temperature compensation provided maintains a uniform value of tripping current throughout the temperature variations of the generator encountered in aircraft operation.

If desired, a shunt 76 having a temperature coefficient of resistance which is substantially the same as that of the series winding 17 of the generator may be utilized in place of the resistor 75. As shown in Fig. 2, the shunt 76 is connected in the circuit for the series field winding 17 and the relay coil DP3 is connected across the shunt. For normal operation and load currents, the increase in resistance of the shunt and of the generator series winding 17 will be substantially the same because of heating of the shunt by the current flowing through it. This scheme of temperature compensation is particularly suitable for utilization with generators which have previously been built, thereby making it impractical to utilize the resistance wire 75 for temperature compensation.

A relay LT having its actuating coil connected across the two outside terminals of the shunt 23 is provided to afford protection against loose terminal connections at either end of the feeder conductors 21 and 22. The relay LT is responsive to an unbalance in the currents carried by the two feeder conductors, since the currents in the two parts of the shunt 23 are normally equal and opposite, and its contact members are connected to energize the trip coil FRT of the relay FR when they are closed by operation of the relay.

As explained hereinbefore, the equalizer disconnect relays EDR of the system function to control the connection of the paralleling coils 38 and 44 of the voltage regulators to the equalizer bus 46. This connection extends from the bus 48 through the conductor 76 and the contact members 49 of the relay EDR to the paralleling coils through a circuit previously traced. The actuating coil of the relay EDR is connected between ground and the conductor 52 by the switch SW3. The conductor 52 is connected to the positive power conductor 24 when the contact members FR1 of the relay FR are closed. Thus, the coil of the relay EDR is energized by the generator voltage to close its contact members 49, and the relay is automatically opened when the generator is shut down by the operation of the field relay FR.

The operation of the system may be briefly described as follows. Assuming that the generator 14 is being driven by an engine (not shown), the field relay FR may be closed by operating the switch SW1 first to the "reset" position and then to the "on" position. When the switch SW1 is actuated to the "reset" position, the coil of the lockout relay LO is energized through a circuit which extends from the control bus 64 through the switch SW1, conductor 77, an interlock 78 on the trip mechanism of the relay FR, and the coil of the relay LO to ground. The relay LO is operated to close its contact members LO1 and LO2. A holding circuit for the coil of the relay is established through the contact members LO2 and the interlock 78 on the relay FR.

When the switch SW1 is operated to the "on" position, the closing coil FRC of the relay FR is energized through the contact members LO1 of the relay LO. The energization of the coil FRC actuates the relay FR to its uppermost position and it is latched in this position by the latching mechanism. After the relay FR is latched in its uppermost position the switch SW1 may be returned to its middle position. The switch SW2 is open and the switch SW3 is closed, during normal operation.

As explained hereinbefore, the closing of the contact members FR1 of the relay FR establishes an energizing circuit for the shunt field winding 16 of the generator 14, thereby permitting the voltage in the generator to build up. The voltage is controlled by the voltage regulator VR. Closing of the field relay contact FR4 connects the relay coils PDR2 and BUP1 to the conductor 24 and, when the generator voltage is of proper magnitude and polarity, the relay PVR closes its contact and completes the circuit of the coils PDR2 and BUP1. When the generator voltage is equal to or slightly greater than the bus voltage the contact members of the relays PDR and BUP are closed to complete the energizing circuits for the switches C1 and C2. These circuits extend from the conductor 52 through the switch SW3, conductor 63 and contact of relay BUP to the coil of the switch C1, and through conductor 62, contact of relay PDR, holding coil PDR3, and conductor 71 to the coil of the switch C2. Thus, when the relays PDR and BUP close their contacts, the switches C1 and C2 are closed to connect the generator to the bus 12. The holding coil PDR3 holds the relay PDR closed, since the voltage applied to the coil PDR2 drops to substantially zero when the switches C1 and C2 close. A lamp 79 is energized through contact members C12 and C22 on the switches C1 and C2, respectively, thereby indicating that these switches are closed. If the direction of current flow through the generator 15 reverses, for any reason, the reverse current coil PDR1 of the relay PDR causes the relay contact to open, interrupting the circuit of the coil of the switch C2 to open the switch and disconnect the generator from the bus. If the switch C2 fails to open, the coil BUP2 of the back-up relay BUP opens the contact of that relay and thus effects interruption of the circuits of the coils of both switches C1 and C2, so that switch C1 opens. Since the relay BUP is preferably set to operate at a higher current than the relay PDR, the relay BUP will normally operate only if the switch C2 fails to open on reverse current or fails to interrupt the current. Since operation of the relays PDR and BUP does not trip the field relay FR, the system remains in operative condition and the generator is automatically reconnected to the bus, in the manner previously described, as soon as its voltage again equals or exceeds the bus voltage.

As described hereinbefore, the field relay FR is tripped upon the occurrence of either an overvoltage condition which causes the operation of the relay OV, or a fault in the generator or feeder circuits which causes the operation of the differential relay DP, or loose connections in the feeder circuits which cause the operation of the relay LT. When this occurs, the field relay FR functions not only to interrupt the control circuit for the line switches C1 and C2, but also to interrupt the energizing circuit for the generator field winding 16. This not only disconnects the generator from the bus, but also reduces its voltage to zero. The generator cannot be reconnected until after the field relay FR has been reset by operating the switch SW1 in the manner previously described to energize the lockout relay LO which has been opened by the operation of the tripping mechanism FRT of the relay FR.

However, if the generator is disconnected from the bus by the opening of the switch SW3, which causes the opening of the switches C1 and C2, it may be reconnected to the bus by simply closing this switch without resetting the relay FR, which has remained in its closed position. Also, if the generator is at any time disconnected from the bus through the operation of the polarized differential relay PDR, in response to a reverse current, as previously described, it will be automatically reconnected to the bus by the relay PDR when the generator again develops sufficient voltage to prevent reverse current from flowing through the generator from the bus 12.

From the foregoing description, it is apparent that we have provided an auxiliary electric power system which is particularly suitable for utilization on aircraft, but which is not necessarily limited thereto. The system provides protection against faults in the generators or their connections, and also protects against overvoltage and reverse current conditions. Temperature compensation is provided to secure proper operation of the system throughout a wide range in operating temperatures.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. A control and protective system for a direct-current generator having a shunt field winding and a series field winding, said system including a feeder circuit for connecting the generator to a load bus, at least a part of said feeder circuit comprising two parallel-connected conductors, relay means for balancing the currents in said parallel-connected conductors against the current in the generator series field winding, said relay means being actuated by unbalance of said currents, means for effecting deenergization of the generator shunt field winding and disconnection of the generator from the bus in response to actuation of the relay means, and temperature-compensating means connected in the circuit of the relay means, said temperature-compensating means comprising resistance means having a resistance which varies with temperature in a manner to effect compensation for change in temperature of the generator series field winding.

2. A control and protective system for a direct-current generator having a shunt field winding and a series field winding, said system including a feeder circuit for connecting the generator to a load bus, at least a part of said feeder circuit comprising two parallel-connected conductors, a relay having an operating coil responsive to the current in one of said parallel-connected conductors, an operating coil responsive to the current in the other of said parallel-connected conductors, and an operating coil responsive to the current in the generator series field winding, the last-mentioned coil opposing the two first-mentioned coils, said relay being actuated by unbalance of said currents, means for effecting deenergization of the generator shunt field winding and disconnection of the generator from the bus in response to actuation of the relay, and temperature-compensating means connected in the circuit of the last-mentioned relay coil, said temperature-compensating means comprising resistance means having a resistance which varies with temperature in a manner to effect compensation for change in temperature of the generator series field winding.

3. A control and protective system for a direct-current generator having a shunt field winding and a series field winding, said system including a feeder circuit for connecting the generator to a load bus, at least a part of said feeder circuit comprising two parallel-connected conductors, a relay having an operating coil responsive to the current in one of said parallel-connected conductors, an operating coil responsive to the current in the other of said parallel-connected conductors, and an operating coil responsive to the current in the generator series field winding, the last-mentioned coil opposing the two first-mentioned coils, said relay being actuated by unbalance of said currents, means for effecting deenergization of the generator shunt field winding and disconnection of the generator from the bus in response to actuation of the relay, and a conductor having a high temperature coefficient of resistance disposed in close physical association with the generator series field winding and connected in the circuit of the last-mentioned relay coil to compensate for change in temperature of the generator.

4. A control and protective system for a direct-current generator having a shunt field winding and a series field winding, said system including a feeder circuit for connecting the generator to a load bus, at least a part of said feeder circuit comprising two parallel-connected conductors, a relay having an operating coil responsive to the current in one of said parallel-connected conductors, an operating coil responsive to the current in the other of said parallel-connected conductors, and an operating coil responsive to the current in the generator series field winding, the last-mentioned coil opposing the two first-mentioned coils, said relay being actuated by unbalance of said currents, means for effecting deenergization of the generator shunt field winding and disconnection of the generator from the bus in response to actuation of the relay, and a shunt connected in series with the generator series field winding, said shunt having approximately the same temperature coefficient of resistance as the series field winding, and the last-mentioned relay coil being connected across the shunt.

5. A control and protective system for a direct-current generator having a shunt field winding and a series field winding, said system including means for connecting the generator to a load bus, said connecting means including two series-connected electrically operated switches, a first polarized relay having a contact connected in the energizing circuit of one of said switches, said first relay having a coil connected to be responsive to current in the generator series field winding and being adapted to actuate its contact to effect opening of said one switch in response to reverse current in the generator, and a second polarized relay having a contact connected in the energizing circuits of both said switches, said second relay having a coil connected to be responsive to current flow in said connecting means between the generator and the bus and being adapted to actuate its contact to effect opening of both switches in response to reverse current in said connecting means, the second relay being adjusted to respond to a higher value of current than the first relay.

6. A control and protective system for a direct-current generator having a shunt field winding and a series field winding, said system including means for connecting the generator to a load bus, said connecting means including two series-connected electrically operated switches, a shunt in the connecting means between the generator and the switches, a first polarized relay having a contact connected in the energizing circuit of one of said switches and having a coil connected across at least a part of the generator series field winding, said first relay being adapted to actuate its contact to effect opening of said one switch in response to reverse current in the generator, and a second polarized relay having a contact connected in the energizing circuits of both said switches and having a coil connected across at least a part of said shunt, said second relay being adapted to actuate its contact to effect opening of both switches in response to reverse current in the shunt, the second relay being adjusted to respond to a higher value of current than the first relay.

7. A control and protective system for a direct-current generator having a shunt field winding and a series field winding, said system including a feeder circuit for connecting the generator to a load bus, at least a part of said feeder circuit comprising two parallel-connected conductors, two electrically operated switches connected in series between said parallel conductors and the bus, a differential relay having an operating coil responsive to the current in one of said parallel conductors, an operating coil responsive to the current in the other of said parallel conductors, and an operating coil responsive to the current in the generator series field winding, the last-mentioned coil opposing the two first-mentioned coils, the differential relay being actuated by unbalance of said currents, means for effecting deenergization of the generator shunt field winding and opening of said switches in response to actuation of said differential relay, a first polarized relay having a contact connected in the energizing circuit of one of said switches, said first relay having a coil connected to be responsive to current in the generator series field winding and being adapted to actuate its contact to effect opening of said one switch in response to reverse current in the generator, and a second polarized relay having a contact connected in the energizing circuits of both said switches, said second relay having a coil connected to be responsive to current flow in said feeder circuit and being adapted to actuate its contact to effect opening of both switches in response to reverse current in the feeder circuit, the second relay being adjusted to respond to a higher value of current than the first relay.

8. A control and protective system for a direct-current generator having a shunt field winding and a series field winding, said system including a feeder circuit for connecting the generator to a load bus, at least a part of said feeder circuit comprising two parallel-connected conductors, two electrically operated switches connected in series between said parallel conductors and the bus, a field relay for controlling the energization of the generator shunt field winding and the energizing circuits of said switches, a differential relay having an operating coil responsive to the current in one of said parallel conductors, an operating coil responsive to the current in the other of said parallel conductors, and an operating coil responsive to the current in the generator series field winding, the last-mentioned coil opposing the two first-mentioned coils, the differential relay being actuated by unbalance of said currents, means for actuating said field relay to effect deenergization of the generator shunt field winding and opening of the switches in response to actuation of said differential relay, a first polarized relay having a contact connected in the energizing circuit of one of said switches, said first relay having a coil connected to be responsive to current in the generator series field winding and being adapted to actuate its contact to effect opening of said one switch in response to reverse current in the generator, and a second polarized relay having a contact connected in the energizing circuits of both said switches, said second relay having a coil connected to be responsive to current flow in said feeder circuit and being adapted to actuate its contact to effect opening of both switches in response to reverse current in the feeder circuit, the second relay being adjusted to respond to a higher value of current than the first relay.

BASCUM O. AUSTIN.
RALPH D. JESSEE.

References Cited in the file of this patent

UNITED STATES PATENTS

| Number | Name | Date |
|---|---|---|
| 2,008,511 | McNairy | July 16, 1935 |
| 2,056,040 | Dozler | Sept. 29, 1936 |
| 2,534,895 | Austin | Dec. 19, 1950 |

FOREIGN PATENTS

| Number | Country | Date |
|---|---|---|
| 19,285 | Great Britain | Sept. 23, 1905 |

OTHER REFERENCES

"D.-C. 24-volt Aircraft Electrical Systems," Westinghouse Engineer, Sept. 1950, page 212.

"Electric-Circuit Fault-Protective Principles as Applied to D.-C. Aircraft Systems," AIEE, paper 44—38.